(12) United States Patent
Owen et al.

(10) Patent No.: US 8,118,463 B2
(45) Date of Patent: Feb. 21, 2012

(54) UNIFORMLY LIGHTING A CYLINDRICAL CAVITY VIA A PRISM

(75) Inventors: Edward Charles Owen, Redmond, WA (US); John Ikeda, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 12/242,336

(22) Filed: Sep. 30, 2008

(65) Prior Publication Data

US 2010/0080017 A1    Apr. 1, 2010

(51) Int. Cl.
*A61B 1/24* (2006.01)
(52) U.S. Cl. ............. 362/577; 362/120; 362/217.01; 362/217.02; 362/249.02; 362/555
(58) Field of Classification Search .......... 362/555, 362/577, 120, 217.01, 217.02, 249.02
See application file for complete search history.

(56) References Cited

U.S. PATENT DOCUMENTS

| | | | |
|---|---|---|---|
| 5,690,414 A * | 11/1997 | Jeng | 362/120 |
| 5,980,063 A * | 11/1999 | Ford et al. | 362/186 |
| 6,337,946 B1 * | 1/2002 | McGaffigan | 385/146 |
| 6,948,838 B2 * | 9/2005 | Kunstler | 362/545 |
| 7,407,304 B2 * | 8/2008 | Tasson et al. | 362/249.07 |
| 7,766,509 B1 * | 8/2010 | Laporte | 362/249.02 |
| 2003/0137838 A1 * | 7/2003 | Rizkin et al. | 362/240 |
| 2004/0080938 A1 * | 4/2004 | Holman et al. | 362/231 |
| 2006/0209524 A1 * | 9/2006 | Tenmyo | 362/16 |
| 2008/0285301 A1 * | 11/2008 | Wanninger et al. | 362/555 |

FOREIGN PATENT DOCUMENTS

JP    2003016805 A  *  1/2003

* cited by examiner

*Primary Examiner* — Diane Lee
*Assistant Examiner* — Mary Zettl
(74) *Attorney, Agent, or Firm* — Woodcock Washburn LLP (57) ABSTRACT

Systems and methods are disclosed for substantially uniformly lighting a substantially cylindrical cavity using a minimal amount of light sources. The primary technique disclosed utilizes directing light through a light pipe where is dispersed appropriately. Further, techniques are disclosed for performing the above functions when the substantially cylindrical cavity is partially filled with an opaque obstruction.

18 Claims, 7 Drawing Sheets

UNIFORMLY LIGHTING A CYLINDRICAL CAVITY VIA A PRISM

BACKGROUND OF THE INVENTION

Often times, it is desirable to evenly distribute light around an area. This may be to avoid shadows or to give the area a consistent appearance. Where energy consumption is not a concern, this can usually be achieved by using a sufficiently large number of illumination sources. Where energy consumption is a concern, for instance if the system is operating on battery power, it is not possible to simply throw more light at the problem. Furthermore, with a limited number of light sources, illuminating the area becomes even more challenging where the area contains opaque obstacles that block an illumination source from illuminating the entire area. Because of these problems, it would be beneficial to have a system and techniques for evenly lighting an area with a small number of light sources.

Various lighting techniques utilizing light pipes are known. Generally, a light pipe is a cavity (frequently rectangular, cylindrical, or some other simple geometric shape) that transports light to another location while minimizing the loss of light during transport, such as by absorption into the walls of the light pipe. These known techniques may not be applied wholesale to the lighting of the perimeter of a substantially cylindrical area.

When the area to be illuminated is substantially cylindrical other considerations come into play. Using the cylinder itself as a light pipe does not work for many materials because those materials absorb too much light. Adding highly reflective paint to the surface of the material also is disfavored because even that paint still absorbs too much light. Guiding light through a separate inner tube produces results closer to those desired, but sufficient uniformity of light distribution is achieved only when there is a sufficiently long lead up into the desired scattering area, so the technique does not work well in shorter cylinders.

SUMMARY OF THE INVENTION

In example embodiments of the present disclosure, a system is provided to uniformly lighting of a cylindrical cavity via a prism. In an embodiment, the system comprises a substantially cylindrical, opaque outer sheath over a substantially cylindrical inner sheath located inside the outer sheath. Coupled to the inside wall of the inner sheath and the outer sheath are at least two light prisms, and each light prism is coupled to a light source. When a light source emits light, it is directed through the prism where it defracts, and then out of the inner sheath, to the outer sheath and through openings in the outer sheath, such that the openings are substantially uniformly lit.

In an embodiment, there are two such light sources, and they are arranged such that a line that bisects the circle formed by the inner sheath along its major axis also bisects the circle formed by each prism along their major axis. That is, the two light sources are placed the maximum distance away from each other. This provides for the most uniform distribution of light when two light sources are used.

In a another embodiment, there are two light sources and an opaque object located inside the inner sheath, and in order to allow room for the object, those two sources are arranged such that a line that bisects the circle formed by the inner sheath along its major axis does not bisect the circle formed by each inner prism along its major axis. The light created by this embodiment is not as uniform as the light created by the embodiment supra, but it is frequently indistinguishable to the human eye.

A method is also described that performs comparable functions as these systems.

BRIEF DESCRIPTION OF THE DRAWINGS

The systems and methods for uniformly lighting of a cylindrical cavity via a prism in accordance with this specification are further described with reference to the accompanying drawings in which:

FIG. 1 illustrates a system for uniformly lighting a cylindrical cavity. FIG. 1A depicts the inner sheath and light prisms of the system, while FIG. 2 illustrates an alternative embodiment of a system for uniformly lighting a cylindrical cavity. FIGS. 2A and 2B depict the inner sheath and light prisms of the system from different vantage points, while

DETAILED DESCRIPTION OF ILLUSTRATIVE EMBODIMENTS

Figure 1A:
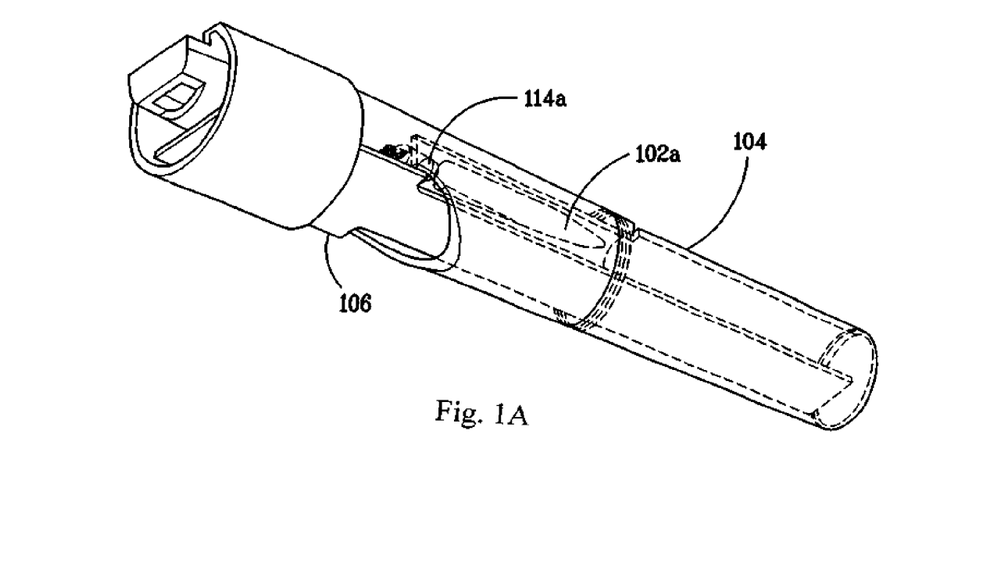
Figure 1B:
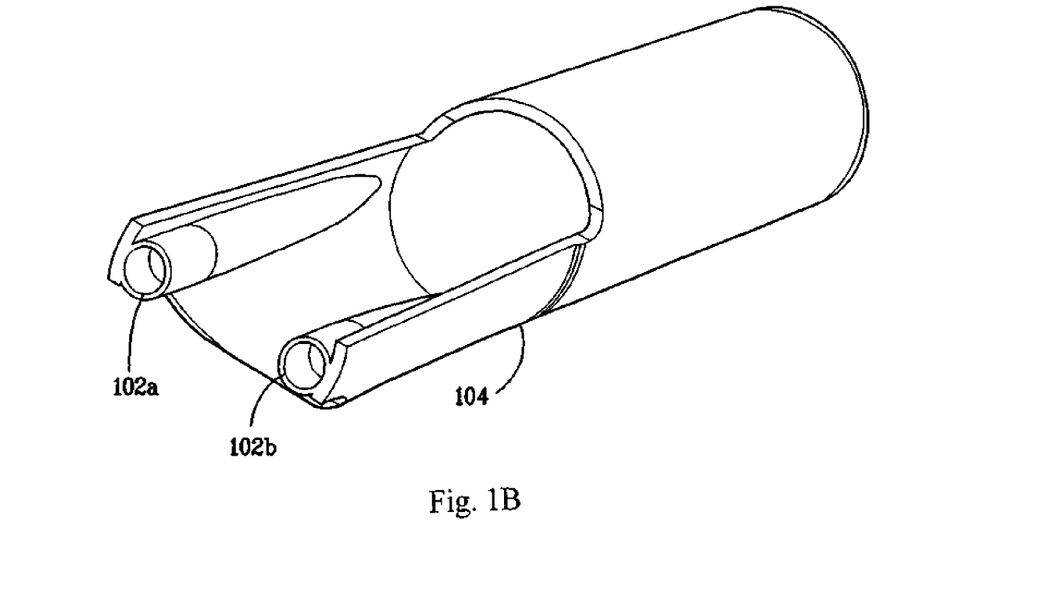
FIG. 1B depicts a fuller system, including FIG. 1A

FIG. 1 illustrates a system for uniformly lighting a cylindrical cavity. FIG. 1A illustrates a portion of the inner sheath 104 including light prisms 102a, 102b. FIG. 1B illustrates another view of the sheath 104, also featuring a light source 114a and an obstruction in the cavity 106.

In FIG. 1A, the circumference of the inner sheath 104 may be thought of as representing a circle. The light prisms 102a, 102b are placed on the inner sheath 104 in such a manner as to be centered on a line that bisects the circle inscribed by that circumference. Put another way, each light prism 102 is attached to the inner sheath 104 such that a line that bisects the major axis of the inner sheath bisects the major axis of each prism. This arrangement of light prisms produces the most uniform distribution of light given two light sources.

The inner sheath may be composed of an opaque material, such as plastic. In an embodiment, the outer portion of the inner sheath, that portion which faces an outer sheath, is either composed of a highly reflective material, or coated with a highly reflective material, such as white paint.

The light prisms 102a, 102b direct light emitted from a light source. In an embodiment, they are formed into a curved, aspherical shape. This shape both directs light towards the end of the light prism, but also diffuse it in such a manner as to distribute it evenly across the perimeter of a substantially spherical form. In an embodiment, the light prism comprises a lens near the point at which the prism accepts light from a light source. This lens may be used to focus, direct or diffuse light from the light source.

In an embodiment, the inside of the light prism—the channel that the light travels through—is composed of a reflective surface. In an embodiment the material that comprises the light prism is itself reflective. In another embodiment the prism is coated with a reflective material on that side.

In an embodiment, the light prisms are attached to the inner sheath because they are all made of a single piece of material.

FIG. 1B illustrates another view of the sheath 104, also featuring a light source 114*a* and an obstruction in the cavity 106.

Light source 114*a* is coupled to light prism 102*a* so that when the light source is emitting light, that light is substantially directed into the light prism. In an embodiment, they are coupled in such a manner so that all light emitted from the light source is directed into the corresponding light prism. In an embodiment the light source comprises a light emitting diode (LED). In an embodiment where there are multiple light sources, each light source emits substantially the same amount of light. For instance, each light source may be rated for the same number of watts.

An obstruction in the cavity 106 interferes with the light source and light prism arrangements. In an embodiment, the obstruction is opaque. In an embodiment, the obstruction is narrowed so as to fit through that portion of the inner sleeve where the light prisms are located. Where the instruction comprises a circuit board, this necessarily means that there is a more limited amount of space on which to place circuitry.

Figure 2A:
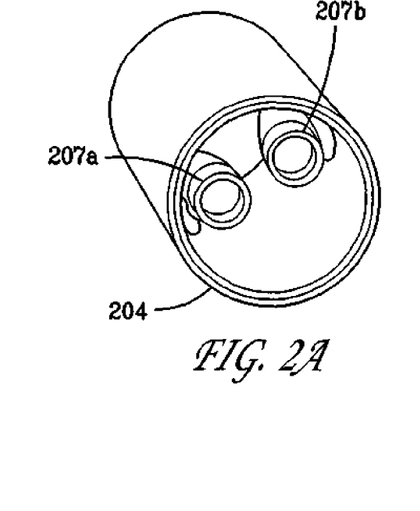

FIG. 2A depicts an embodiment of an inner sheath 204 coupled to two light prisms 202*a*, 202*b*. In this embodiment, each light prism is attached to the inner sheath such that a line that bisects the major axis of the inner sheath does not bisect the major axis of each inner prism. Put another way, each light prism 202 is attached to the inner sheath 204 such that a line that bisects the major axis of the inner sheath does not bisect the major axis of each prism. This arrangement produces a less uniform distribution of light as does FIG. 1, but allows for a greater amount of material to be placed inside the cavity. For instance, this arrangement may allow for a larger circuit board to be placed inside the cavity, while still producing a level of light that is sufficiently uniform as to be indistinguishable by the human eye from the uniformity of light in the embodiment of FIG. 1.

Figure 2B:
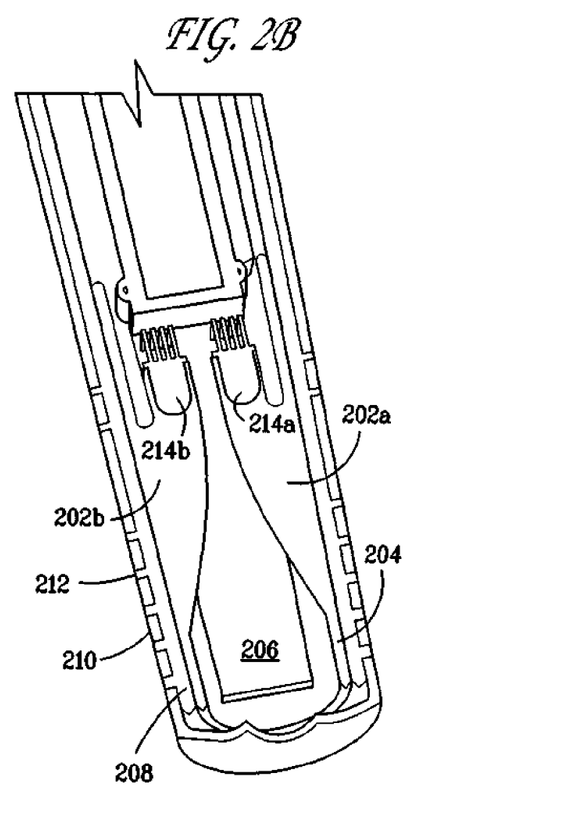

FIG. 2B depicts a cross-section of the inner sheath 204 of FIG. 2A. Of note are the openings of the light prism 202*a*, 202*b* where light sources may be placed, and the curved pathways where the light is directed 216*a*, 216*b*.

Figure 2C:
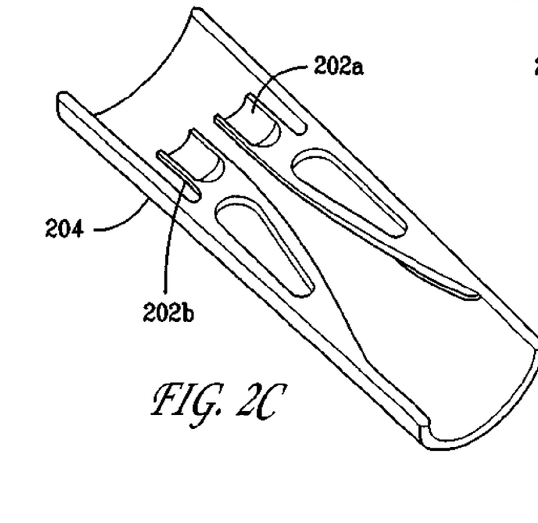
FIG. 2C depicts a fuller system, including FIGS. 2A and 2B.

FIG. 2C depicts the inner sheath of FIG. 2A and FIG. 2B placed inside a fuller system for the uniform distribution of light in a cylindrical cavity. In an embodiment, this system comprises the handle of a microphone.

Light is emitted at the light sources 214, where it travels through the light prisms 202. In there, it becomes diffuse, and enters the outer shell. In an embodiment the outer shell comprises a translucent or transparent main sheath and a opaque covering sheath located on the outer edge of the main sheath. This covering sheath may comprise a plurality of holes to allow light to escape. In this embodiment, the main sheath may have protrusions that line up with the holes of the covering sheath so that when the two are coupled, the protrusions fill the holes giving the combined main sheath and covering sheath a smooth exterior.

In an embodiment, a portion of the opaque portion of the outer sheath comprises a reflective material. In an embodiment, a portion of the opaque portion of the outer sheath is coated with a reflective substance. This may typically be that portion of the outer sheath facing inward toward the light prism that light being directed out of the prism may come into contact with before being directed through a hole in the outer sheath.

In an embodiment, the cavity of the inner sheath is partially filled by an opaque object, such as, in the embodiment where the system comprises the handle to a microphone, a circuit board. Due to the arrangement of the light prisms in the system of FIG. 2, a larger circuit board may fit inside the cavity than in the cavity of FIG. 1. So, where the system of FIG. 1 may generate a more uniform light distribution, the system of FIG. 2 allows for a larger object to be placed inside the system's cavity, without markedly detracting from the uniformity of the light distribution.

Figure 3:
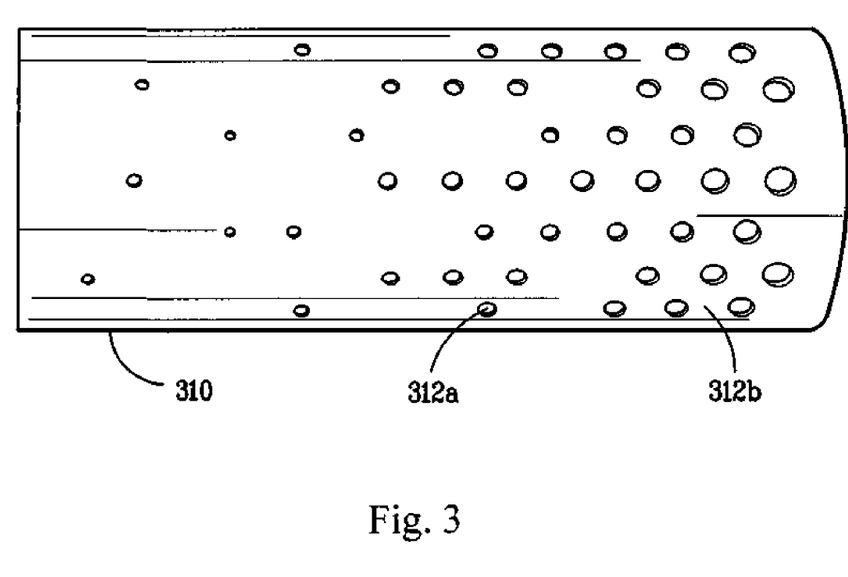
FIG. 3 depicts a view of the outer shell of system with a substantially uniform distribution of light emanating therefrom.

FIG. 3 depicts a view of the outer shell of system with a substantially uniform distribution of light emanating therefrom. The outer sheath primarily comprises a opaque portion 312. It may also comprise a plurality of holes 312 that allow light generated by the light sources 214 to exit. In the embodiment where the outer sheath further comprises a translucent or transparent main sheath and a opaque covering sheath located on the outer edge of the main sheath. the main sheath may have protrusions that line up with the holes of the covering sheath so that when the two are coupled, the protrusions fill the holes giving the combined main sheath and covering sheath a smooth exterior. When each light source 214 is emitting light, each hole 312 will appear to be approximately as bring as every other hole 312.

Figure 4A:
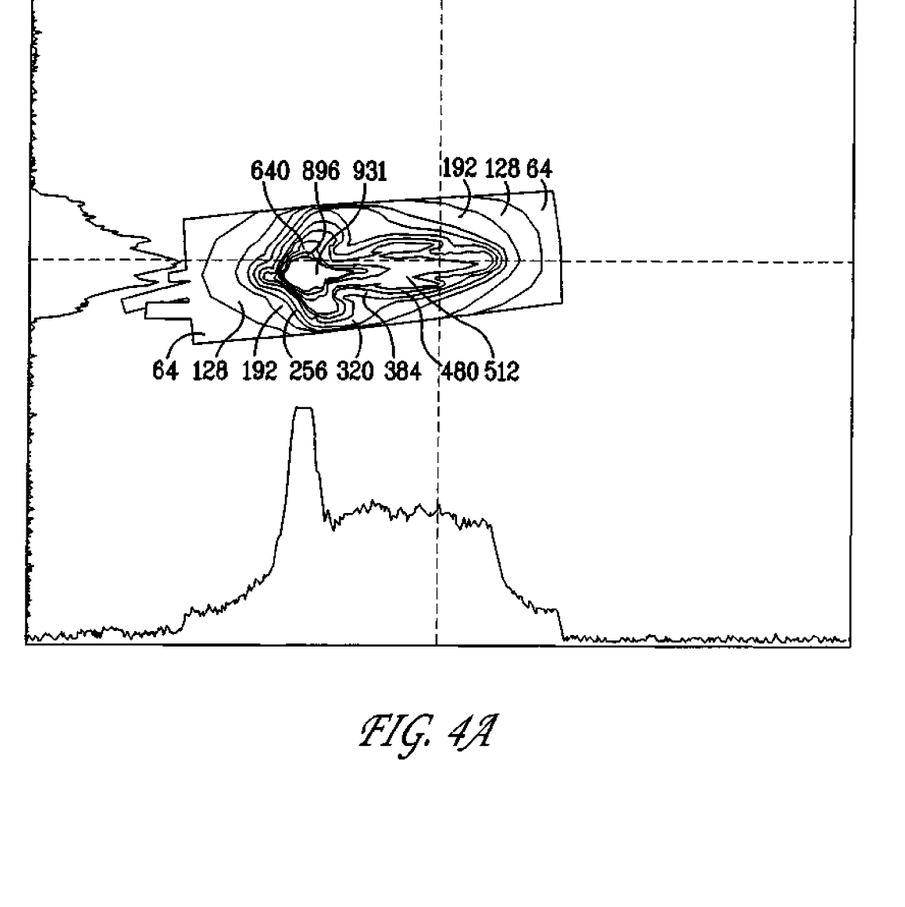
FIG. 4a depicts a substantially uniformly lit substantially cylindrical cavity as described above.
Figure 4B:
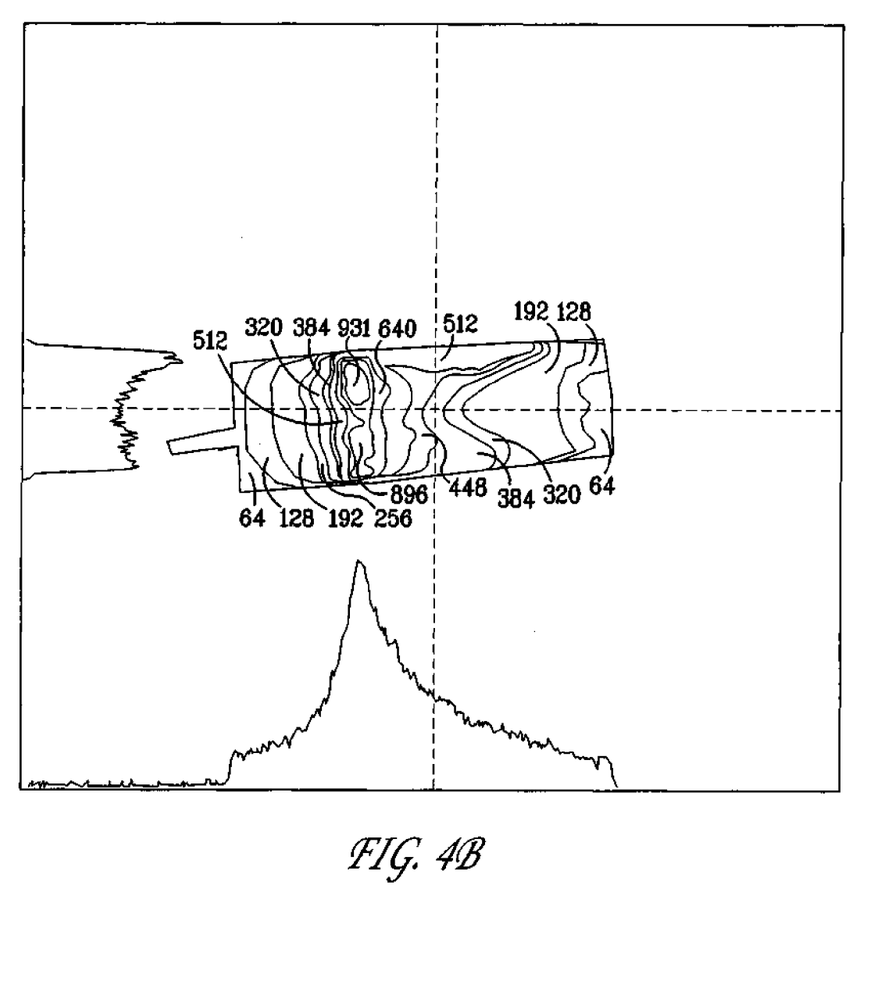
FIG. 4b depicts that cavity rotated 90 degrees.

FIG. 4*a* depicts a substantially uniformly lit substantially cylindrical cavity as described above. FIG. 4*b* depicts that cavity rotated 90 degrees. The graphs on the left side (y-axis) 402 and bottom (x-axis) 404 of each FIG. 4 represent the intensity of light measured at that point on the graph. For instance, the peak of the graph along the x-axis corresponds to the most intense light outputted, 931. The regions of the cylinder correspond to the intensity of light outputted, going in order from low to high, 64, 128, 192, 256, 320, 384, 480, 512, 640, 896 and 931 (those element numbers also correspond to wavelengths of light in nm). Note that, over span of the cylinder, the intensity along both the x-axis and y-axis is roughly uniform.

FIG. 4*b* depicts the scene of FIG. 4*a* where the cylinder has rotated 90-degrees along its major axis. Here, there are two pockets of the most intense light 896 and 931 because one light source is not behind the other light source (further away), were the cylinder in three-dimensions. In contrast, in FIG. 4*a*, there is only one source of intense light, 931, because one of the light sources is covering the other light source from the viewer's perspective. Note that, as expressed in the graphs along the y-axis and x-axis, the light intensity is substantially uniform, particularly along the y-axis.

Figure 4C:
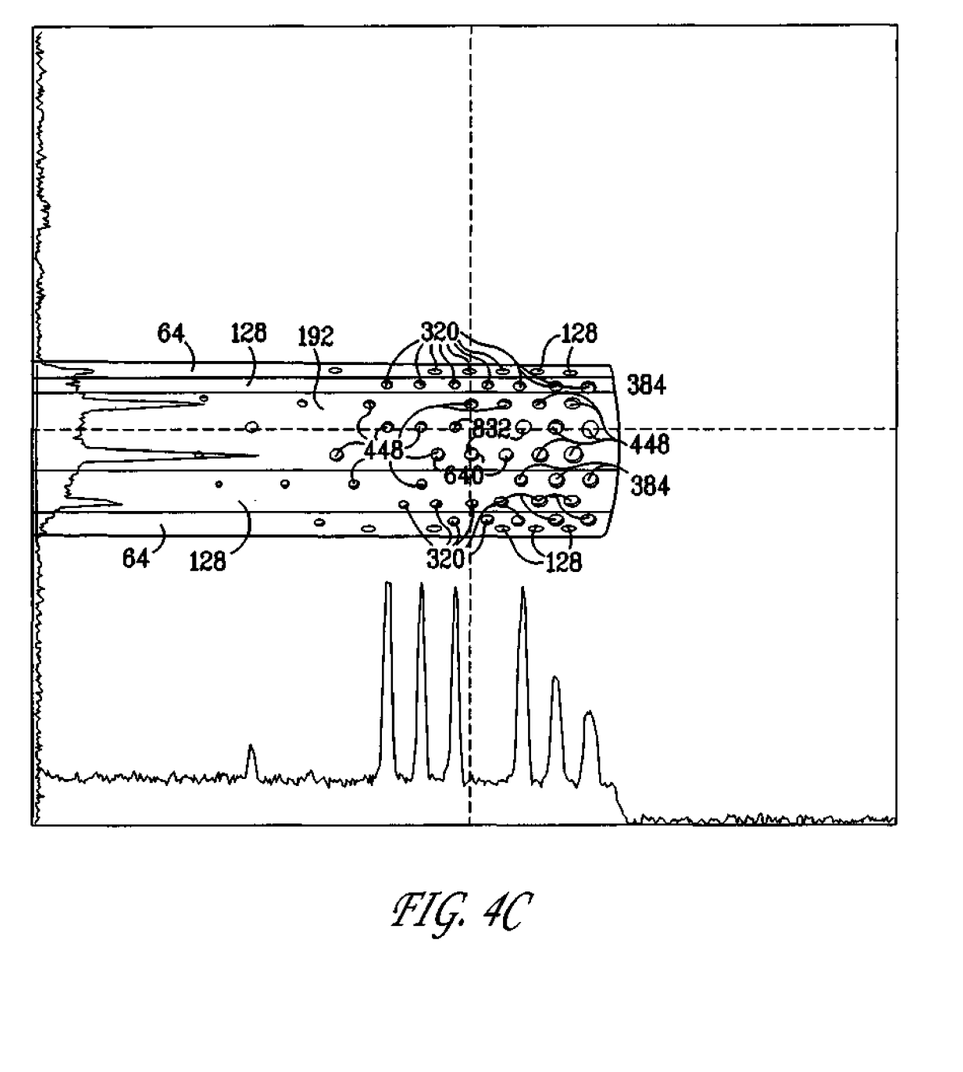
FIG. 4c depicts the scene in FIGS. 4a and 4b where the cylindrical sheath has a plurality of holes in it.

FIG. 4*c* depicts the scene in FIGS. 4*a* and 4*b* where the cylindrical sheath has a plurality of holes in it. The graphs along the x-axis and y-axis here have spikes corresponding to the placement of holes, where light is allowed to freely escape. Note that, especially along the x-axis graph, the intensity of the light is substantially uniform. As with FIGS. 4*a* and 4*b*, the element numbers present correspond to the intensity of light outputted, 64, 128, 192, 320, 448, 640, 832.

Figure 5:
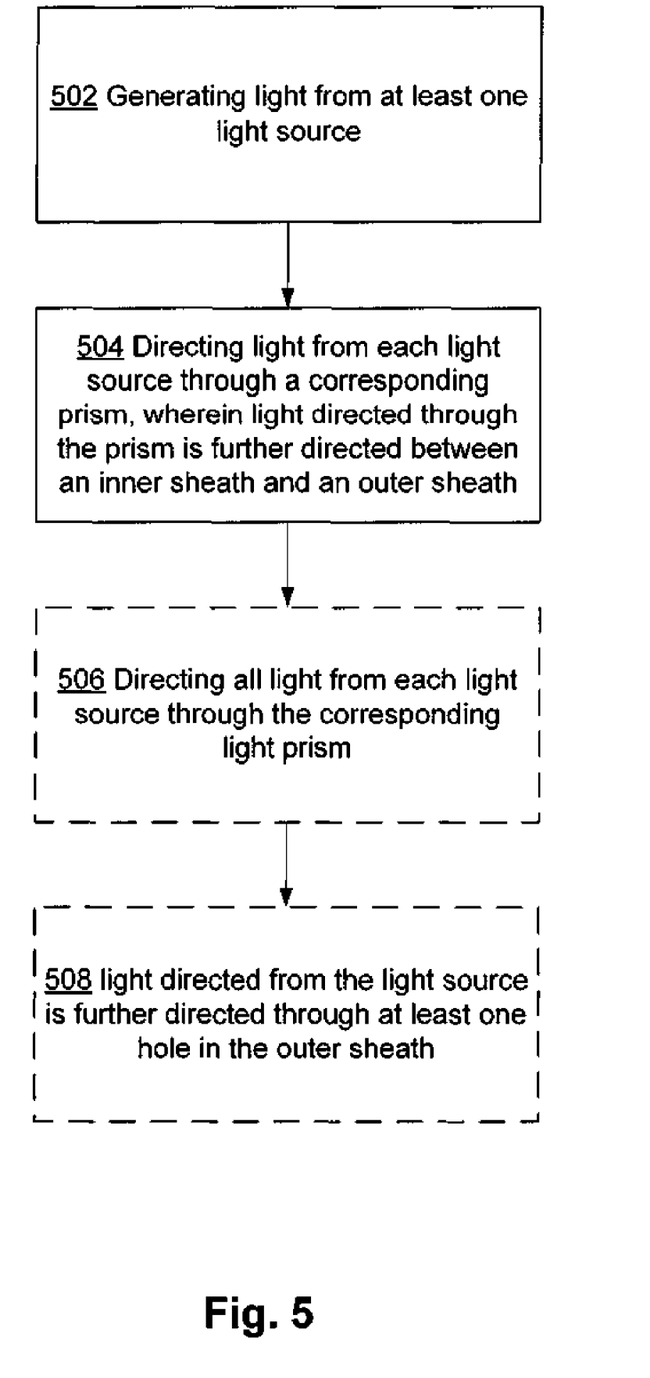
FIG. 5 illustrates exemplary operating steps for a method for uniformly lighting a cylindrical cavity via a prism.

FIG. 5 illustrates exemplary operating steps for a method for uniformly lighting a cylindrical cavity via a prism. Operations 506-508 are optional operations. The method comprises generating light at a light source 502. That light is then directed through a corresponding light prism 504, wherein light through a prism is further directed between an inner sheath and an outer sheath of the substantially cylindrical shape. In an embodiment, directing the light includes directing all light from each light source through the corresponding light prism 506. In an embodiment, the light directed from a light source is further directed through at least one hole in the outer sheath 508. In an embodiment, each light source and corresponding light prism is placed such that, when the cylindrical shape is bisected along its major access so as to produce two substantially semi-cylindrical shapes, each light source is located within the same semi-cylindrical shape.

What is claimed:

1. A system for a uniformly lit perimeter of a substantially cylindrical shape, comprising:
    a substantially cylindrical outer sheath, the substantially cylindrical outer sheath having a plurality of holes on its side;
    a substantially cylindrical inner sheath located inside the outer sheath, the substantially cylindrical inner sheath being substantially opaque;
    at least two light sources; and
    a light prism coupled to each light source, each light prism attached to the inner sheath, such that light directed through the prism is directed between the inner sheath and the outer sheath wherein the substantially cylindrical shape comprises a handle of a microphone.

2. The system of claim 1, wherein each light prism is attached to the inner sheath such that a line that bisects the major axis of the inner sheath bisects the major axis of each prism.

3. The system of claim 1, wherein each light prism is attached to the inner sheath such that a line that bisects the major axis of the inner sheath does not bisect the major axis of each inner prism.

4. The system of claim 3, further comprising:
    an opaque object located inside the inner sheath.

5. The system of claim 1, wherein the light source comprises a light emitting diode.

6. The system of claim 1, wherein the outer sheath is opaque.

7. The system of claim 1, wherein the outer sheath comprises:
    a translucent main sheath; and
    an opaque covering sheath, wherein the covering sheath has a larger diameter than the main sheath and the main sheath is placed inside the covering sheath.

8. The system of claim 1, wherein the outer surface of the inner sheath or the inner surface of the outer sheath is composed of a reflective substance.

9. The system of claim 1, wherein the outer surface of the inner sheath or the inner surface of the outer sheath is coated with a reflective surface.

10. The system of claim 1, wherein the system comprises:
    a handle of a microphone.

11. The system of claim 1, wherein a light prism comprises:
    a reflective surface and a lens.

12. The system of claim 1, wherein each light prism comprises:
    a curved aspheric shape.

13. The system of claim 1, wherein each light source is attached to its corresponding light prism such that all light emitted from the light source enters the light prism.

14. The system of claim 1, wherein each light source emits substantially the same amount of light.

15. The method of claim 14, wherein directing light includes:
    directing all light from each light source through the corresponding light prism.

16. The method of claim 14, wherein each light source and corresponding light prism is placed such that, when the cylindrical shape is bisected along its major access so as to produce two substantially semi-cylindrical shapes, each light source is located within the same semi-cylindrical shape.

17. A method for uniformly lighting the perimeter of a substantially cylindrical shape, comprising:
    directing light from each of two light sources through a corresponding light prism, at least some of the light being directed through a prism being further directed between a substantially opaque inner sheath and an outer sheath of the substantially cylindrical shape, and directed out of at least one hole of a plurality of holes on the side of the outer sheath wherein the substantially cylindrical shape comprises a handle of a microphone.

18. A system for a uniformly lit perimeter of a substantially cylindrical microphone handle, comprising:
    a substantially cylindrical opaque outer sheath that comprises at least one a plurality of openings on its side, wherein the inner surface of the outer sheath is reflective;
    a substantially cylindrical and substantially opaque, inner sheath located inside the outer sheath, wherein the outer surface of the inner sheath is reflective;
    an opaque circuit board located inside the inner sheath;
    at least two light emitting diodes, wherein each light emitting diode emits substantially the same amount of light; and
    a light prism, comprising a prism, a lens and a substantially curved aspheric shape, coupled to each light emitting diode such that all light emitted from each light emitting diode is directed through the corresponding prism; each light prism attached to the inner sheath such that light directed through the prism will be directed between the inner sheath and the outer sheath, and such that, when the cylindrical shape is bisected along its major access so as to produce two substantially semi-cylindrical shapes, each light emitting diode is located within the same semi-cylindrical shape.

* * * * *